E. FRANK.
ORANGE KNIFE.
APPLICATION FILED NOV. 2, 1911.
1,041,767.
Patented Oct. 22, 1912.
Fig.1.
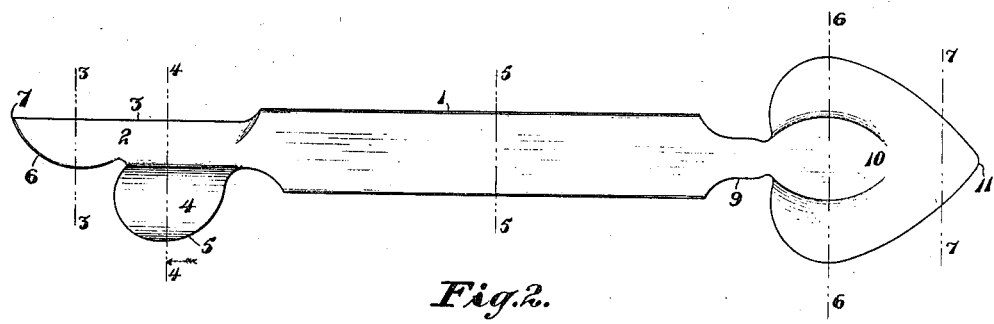
Fig.2.
Fig.3.  Fig.4.  Fig.5.  Fig.6. 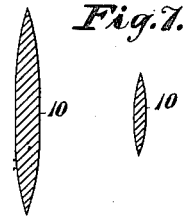 Fig.7.
WITNESSES
INVENTOR
Edward Frank
BY
J. M. Wright,
ATTORNEY

UNITED STATES PATENT OFFICE.

EDWARD FRANK, OF SAN FRANCISCO, CALIFORNIA.

ORANGE-KNIFE.

1,041,767.  Specification of Letters Patent.  Patented Oct. 22, 1912.

Application filed November 2, 1911. Serial No. 658,136.

*To all whom it may concern:*

Be it known that I, EDWARD FRANK, a subject of the Emperor of Austria-Hungary, residing at San Francisco, in the county of San Francisco and State of California, have invented new and useful Improvements in Orange-Knives, of which the following is a specification.

The object of the present invention is to provide a knife especially adapted for peeling and quartering oranges.

In the accompanying drawing, Figure 1 is an edge view of my improved knife; Fig. 2 is a plan view thereof; Figs. 3, 4, 5, 6 and 7 are cross-sectional views on the lines 3—3, 4—4, 5—5, 6—6, and 7—7 respectively in Fig. 2.

Referring to the drawing, it will be seen that my improved knife is constructed in one piece, the middle portion 1 thereof forming a handle which may be of any suitable size or shape. Said handle at one end is extended, as shown at 2, and one edge 3 of said extended portion is made sharp and straight, this edge being used to peel the white thin inner skin of an orange after the outer yellow skin has been removed. The side of said terminal portion 2 opposite to said edge 3 is formed with a rounded lateral concavo-convex extension 4, which has a comparatively sharp edge 5, forming a knife which can be used to peel the outer yellow skin of the orange. The terminal portion 6 of said other side is rounded, and its edge forms with said sharp edge 3 a pointed end 7, which is used to extract the end of the core of the orange. Said handle 1 at the other end is formed with a neck 9, and a blade 10. The lateral edges of said blade converge to one another at a considerable angle to form a point 11 so that said blade approximately resembles the conventional form of a spade as shown on ordinary playing cards. Said blade is used for the purpose of separating from each other the sections into which an orange is naturally divided, the edge of the blade being sufficiently sharp to effect this result without cutting the thin skin which covers the individual sections.

The knife is constructed of material which will not be affected by citric acid, such as silver or brass silver-plated.

I claim:—

A device of the character described comprising a thin wide substantially straight handle having at one end, in alinement therewith, an integral extension formed at one side with a substantially straight edge, the terminal portion of said extension being comparatively narrow and terminating in a sharp point, and the remainder of said extension extending laterally in a rounded form at the side remote from the first-named side and being concavo-convex in form, said handle having at the other end an integral extension forming a blade having comparatively blunt edges converging to a blunt point remote from said handle.

In testimony whereof I have hereunto set my hand in the presence of two subscribing witnesses.

EDWARD FRANK.

Witnesses:
 F. M. WRIGHT,
 D. B. RICHARDS.